(12) United States Patent  
Wernaers (10) Patent No.: US 9,456,296 B2
(45) Date of Patent: Sep. 27, 2016

(54) CONTROL OF THE TRANSMISSION OF A VOICE SIGNAL OVER A BLUETOOTH® RADIO LINK

(75) Inventor: Yves Wernaers, Teralfene (BE)

(73) Assignee: ST-ERICSSON SA, Plan-les-Ouates (CH)

( * ) Notice: Subject to any disclaimer, the term of this patent is extended or adjusted under 35 U.S.C. 154(b) by 137 days.

(21) Appl. No.: 14/131,333

(22) PCT Filed: Jul. 26, 2012

(86) PCT No.: PCT/EP2012/064717
§ 371 (c)(1),
(2), (4) Date: Jan. 7, 2014

(87) PCT Pub. No.: WO2013/017527
PCT Pub. Date: Feb. 7, 2013

(65) Prior Publication Data
US 2014/0162555 A1    Jun. 12, 2014

Related U.S. Application Data

(60) Provisional application No. 61/522,820, filed on Aug. 12, 2011.

(30) Foreign Application Priority Data

Jul. 29, 2011    (EP) ..................... 11175991

(51) Int. Cl.
| G10L 25/78 | (2013.01) |
| H04W 4/00 | (2009.01) |
| H04W 76/04 | (2009.01) |
| G10L 19/012 | (2013.01) |
| H04W 84/18 | (2009.01) |

(52) U.S. Cl.
CPC ........... *H04W 4/008* (2013.01); *H04W 76/048* (2013.01); *G10L 19/012* (2013.01); *H04W 84/18* (2013.01)

(58) Field of Classification Search
CPC ......... H04B 1/46; G06F 3/165; G10L 25/78; G10L 25/69
See application file for complete search history.

(56) References Cited

U.S. PATENT DOCUMENTS

| 3,832,491 | A | * | 8/1974 | Sciulli et al. | ................ 704/212 |
| 5,553,220 | A | * | 9/1996 | Keene | ....................... G06F 3/16 |
| | | | | | 345/520 |
| 6,220,876 | B1 | * | 4/2001 | Avila | ................... H01R 9/2466 |
| | | | | | 439/34 |

(Continued)

FOREIGN PATENT DOCUMENTS

EP    1 463 246 A1    9/2004

OTHER PUBLICATIONS

International Search Report issued in corresponding International application No. PCT/EP2012/064717, date of mailing Sep. 25, 2012.

*Primary Examiner* — Cindy Trandai
(74) *Attorney, Agent, or Firm* — Patent Portfolio Builders PLLC (57) ABSTRACT

It is proposed a method for controlling the transmission of a sampled voice signal over a Bluetooth® radio link. The method comprises the steps of:
a) monitoring the sampled voice signal for detecting whether the sampled voice signal comprises a number of consecutive silence samples; and
b) halting the transmission of the sampled voice signal over the Bluetooth® radio link after having transmitted said consecutive silence samples.

16 Claims, 7 Drawing Sheets

(56) References Cited

U.S. PATENT DOCUMENTS

| | | |
|---|---|---|
| 7,693,708 B2 | 4/2010 | Gournay et al. |
| 7,756,709 B2 * | 7/2010 | Gierach .................. G10L 25/87 704/208 |
| 2002/0172185 A1 * | 11/2002 | Mito et al. .................... 370/347 |
| 2005/0055201 A1 * | 3/2005 | Florencio ................ G10L 25/87 704/214 |
| 2005/0117629 A1 * | 6/2005 | Karasudani ............ H04B 7/264 375/146 |
| 2005/0207541 A1 * | 9/2005 | Cote ...................... H04M 11/10 379/46 |
| 2008/0151769 A1 * | 6/2008 | El-Hennawey ......... G10L 25/69 370/252 |
| 2008/0212567 A1 * | 9/2008 | El-Hennawey ......... G10L 25/69 370/352 |
| 2009/0017879 A1 * | 1/2009 | Tsfaty et al. ................... 455/574 |
| 2009/0109921 A1 * | 4/2009 | Bowen ................. H04W 36/24 370/331 |
| 2013/0021965 A1 * | 1/2013 | Chu ........................ H04W 4/10 370/328 |

\* cited by examiner

| Relative power consumption | The controller is not implemented | | Master implements the controller | | Slave implements the controller | |
|---|---|---|---|---|---|---|
| | Master | Slave | Master | Slave | Master | Slave |
| HV3 | 100% | 100% | 63% | 83% | 83% | 63% |
| EV3 + 1-retx | 100% | 100% | 63% | 84% | 85% | 77% |
| EV3 + 2-retx | 100% | 100% | 63% | 85% | 85% | 79% |
| 2-EV3 + 1-retx | 100% | 100% | 63% | 83% | 85% | 77% |
| 2-EV3 + 2-retx | 100% | 100% | 63% | 85% | 85% | 78% |

CONTROL OF THE TRANSMISSION OF A VOICE SIGNAL OVER A BLUETOOTH® RADIO LINK

FIELD OF THE INVENTION

The invention relates to the field of wireless transmission, and especially to the control of the transmission of a voice signal over a Bluetooth®.

BACKGROUND OF THE INVENTION

Wireless communication tends to be generalized in the apparatuses forming part of our everyday life, and these are in particular the apparatuses and devices designed for the public.

In this respect, the quick development of the wireless communication protocol known as Bluetooth® is particularly illustrative.

Bluetooth® is a low-power, short-range wireless networking standard designed for local area voice and data transfer. Bluetooth® is a packet-based protocol which relies on a master-slave communication model. In this model, one master may communicate with up to 7 slaves in a piconet, both master and slave devices sharing the same channel and a same clock of the master. The master controls formation of Bluetooth® communication links and procedures with slaves. Thus, a slave may transmit only after being polled by the master, that is, the medium access control lies with the master. Both master and slaves may transmit on available slots, as defined by the master's Bluetooth® clock. Time may be divided into slots of 625 µs (microseconds) in the piconet. The master and the slave thus transmit packets alternatively, and the packet may be of length 1, 3 or 5 slots. The master and slaves in the piconet may alternate transmission time using a time-division multiplexing. A time-division-duplex (TDD) emulates full duplex communication over a half duplex communication link.

Bluetooth® supports voice and data traffics. The data traffic is given a best effort service while the voice traffic is given a guaranteed service and is allocated 64 Kbps bandwidth. Three kinds of radio communication links are supported between a master and a slave: synchronous Connection-Oriented (SCO), enhanced synchronous Connection-Oriented (e-SCO) and asynchronous Connection-less (ACL). SCO link reserves or allocates predetermined time slots on the time axis. In practice, an SCO link is used for transporting voice traffic. ACL link randomly uses time slots on the time axis for communications, and it is typically used for transporting data traffic.

The SCO link defined in the Bluetooth® specification provides a full-duplex symmetric 64 Kbps link between the master and a slave with reserved time slots. The master transmits SCO packets in reserved master-to-slave SCO slots to the slave at regular SCO interval, and the slave is allowed to respond with SCO packets in reserved slave-to-master SCO slots. No SCO packet retransmission occurs over the SCO link. The SCO packets are typically used for 64 kb/s speech transmission with a fixed payload length of 240 bits.

Enhanced SCO (eSCO) link provides greater flexibility than SCO link in setting up link Indeed, eSCO allows retransmission mechanisms to achieve reliability, and also a wider variety of packet types, and greater intervals between packets than SCO, thus increasing radio availability for other links. Further, eSCO includes a CRC (Cyclic Redundancy Check) as part of the audio data packet to allow error detection and a re-transmission request, higher data rates by using packets that span more than 1 timeslot, and allows asymmetric links to allow high quality audio to be streamed in one direction.

Bluetooth® supports voice traffics so that this protocol can be used for transmitting voice during a telephone call. For instance, a Bluetooth® headset may act as a slave connected to a cell phone having Bluetooth® capabilities and acting as master. Voice may be transmitted from the headset to the cell phone (and inversely) on a symmetric link with reserved channel bandwidth and regular periodic exchanges of data representing the voice traffic in the form of reserved slots.

Transmitting voice data is particularly power consuming, both for the Bluetooth® headset and for the cell phone point of view. As energy saving is critical for operation life of battery of electronic mobile communication devices using Bluetooth® and reduction of energy consumption of these devices is currently a major concern, there is a need for a solution permitting to reduce the energy consumption of a device using a Bluetooth® radio link connection for transmitting voice traffic.

SUMMARY OF THE INVENTION

An object of embodiments of the present invention is to alleviate at least partly the above mentioned drawbacks. More particularly, embodiments of the invention aim at improving the way of reducing the energy consumption of a device using a Bluetooth® radio link connection.

This is achieved with a method for controlling the transmission of a sampled voice signal over a Bluetooth® radio link. The method comprises the steps of: a) monitoring the sampled voice signal for detecting whether the sampled voice signal comprises a number of consecutive silence samples; and b) halting the transmission of the sampled voice signal over the Bluetooth® radio link after having transmitted said consecutive silence samples.

That a specific number of consecutive silence samples are detected and transmitted before halting the transmission has the effect that the codec at both the transmitter and receiver side are emptied (or more generally driven to a specific state) in a controlled manner, thus being in the corresponding (e.g. same) state when the transmission is halted as well as being in the corresponding (e.g. same) state when the transmission might be restarted at a later point in time.

One advantage of this effect is that errors, distortion and artifacts may be avoided at transmission restart. Thus, according to some embodiments, the receiver performance does not suffer from the transmission halting. In some embodiments, the receiver might not even notice the transmission halting.

Another advantage is that power consumption may be lowered according to some embodiments. Because the halting of transmission of the sampled voice signal is done gracefully, according to a protocol including the codec state control as described above, one or several parts of the transmitter may be turned off after the halting of transmission. Other power saving particulars of embodiments of the invention when applied in various Bluetooth link scenarios will be apparent for example from FIGS. 7-14 elaborated on below.

This is also achieved with a computer program product comprising a computer readable medium, having thereon a computer program comprising program instructions, the computer program being loadable into a data-processing unit and adapted to cause execution of the method when the computer program is run by the data-processing unit.

This is also achieved with a data storage medium having recorded thereon a computer program comprising instructions for performing the method.

This is also achieved with a controller for controlling the transmission of a sampled voice signal over a Bluetooth® radio link. The controller comprises a monitoring unit adapted to monitor the sampled voice signal, a detection unit adapted to detect whether the sampled voice signal comprises a number of consecutive silence samples and a protocol handler adapted to halt the transmission of the sampled voice signal over the Bluetooth® radio link after having transmitted said consecutive silence samples.

This is also achieved with an electronic device, comprising a Bluetooth® module and a controller for controlling the transmission of a voice signal by the Bluetooth® transmitter over a Bluetooth® radio link.

In such a case, the device may be a mobile communication device.

The electronic device may further comprise a memory adapted to store a computer program for controlling the execution of one or more units of the controller.

This is also achieved with an electronic chip adapted to implement the controller for controlling the transmission of a sampled voice signal over a Bluetooth® radio link.

Embodiments of the invention offer many advantages, including the following:

- a significant power consumption improvement to both a transmitter and a receiver when operating a radio link such as a Bluetooth® radio link for transmitting a sampled voice signal;
- embodiments of the invention are typically only implemented on the transmitter side in a Bluetooth® communication system comprising a transmitter and a receiver.

In an example, the number of consecutive silence samples may be predetermined.

Alternatively, the number of consecutive silence samples may be dynamically determined.

In addition, the method of the invention may comprise continuously performing step a) as sampling of the voice signal goes on.

Furthermore, the method of the invention may comprise, after step b), the steps of c) monitoring the sampled voice signal for detecting whether the sampled voice signal comprises voice samples and d) starting the transmission of the sampled voice signal over the Bluetooth® radio link according to the detection in step c).

Additionally, the method of the invention, wherein the sampled voice signal is sent over the Bluetooth® radio link in packets, may comprise, after step b), the step of e) maintaining the Bluetooth® radio link by sending time to time one or more packet(s) over the Bluetooth® radio link.

Moreover, the method of the invention, wherein the sampled voice signal is sent over the Bluetooth® radio link in packets, may comprise, after step b), the steps of f) counting the time elapsed between the current time and the time at which the latest packet was sent over the Bluetooth® radio link, g) sending one or more packet(s) over the Bluetooth® radio link for maintaining the Bluetooth® radio link when the elapsed time reaches a predetermined value; h) applying again steps f) and g) with respect to the latest packet sent at step g).

In such a case, the predetermined value may advantageously be less than 250 ms.

Furthermore, the Bluetooth® radio link may be one of a synchronous connection-oriented link or an enhanced synchronous connection-oriented link.

In an example, the controller may be further adapted to maintaining the Bluetooth® radio link by sending time to time one or more packet(s) over the Bluetooth® radio link.

In addition, the controller may further comprise a timer adapted to count the time elapsed between the current time and the time at which the latest packet was sent over the Bluetooth® radio link, and the protocol handler is further adapted to send one or more packet(s) over the Bluetooth® radio link for maintaining the Bluetooth® radio link when the elapsed time reaches a predetermined value.

Furthermore, the controller may further comprise a memory adapted to store the number of consecutive silence samples to be detected in the sampled voice signal for halting the transmission of the sampled voice signal over the Bluetooth® radio link.

In addition, the memory may be further adapted to store the predetermined value to be reached by the elapsed time.

In addition, the protocol handler may be further adapted to handle a synchronous connection-oriented Bluetooth® radio link and/or an enhanced synchronous connection-oriented Bluetooth® radio link.

Further features and advantages of embodiments of the invention will appear from the following description of some embodiments of the invention, given as non-limiting examples, with reference to the accompanying drawings listed hereunder.

DETAILED DESCRIPTION OF EMBODIMENTS OF THE INVENTION

It may be observed that generally during a telephone call, there is only a single person talking, so around 50% of the packets transmitted and received contain so-called silence which is actually noise or complete silence. Moreover, even during actual speech, a lot of silence is present. In consequence, both combined typically result in transmission of silence well over 70% of the time.

In theory, silence should preferably not be transmitted as the content can be reconstructed without loss of quality at the receiver side. However, according to the Bluetooth® standard, silence and voice are not differentiated, hence silence is also be transmitted. As a result, power is consumed for transmitting and receiving silence, which implies that power of both the slave and the master is wasted. Moreover, when using an eSCO connection, the receiver (of the slave and of the master) requests a retransmission, which in turn further increases the receiver and transmitter power consumption. Typically, a retransmission may be requested when packets are lost or damaged, and the retransmission occurs inside a dedicated retransmission time slot. Examples of (e)SCO transactions between a master and a slave Bluetooth® devices are depicted in FIGS. 7 to 14.

Figure 7:
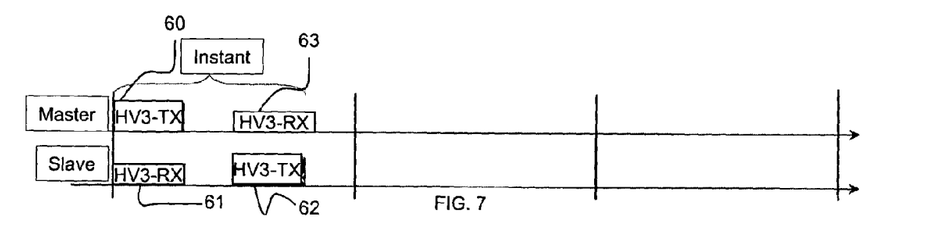
FIGS. 7 to 9 show examples of SCO transactions between a master and a slave Bluetooth® devices.
Figure 8:
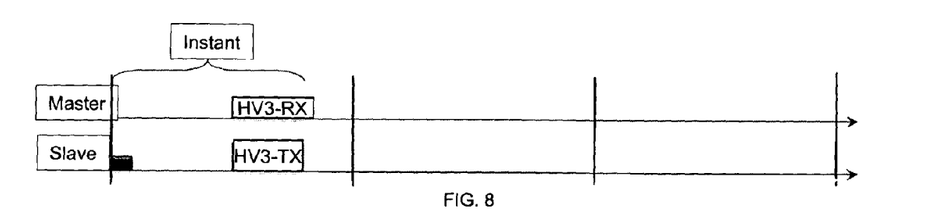
Figure 9:
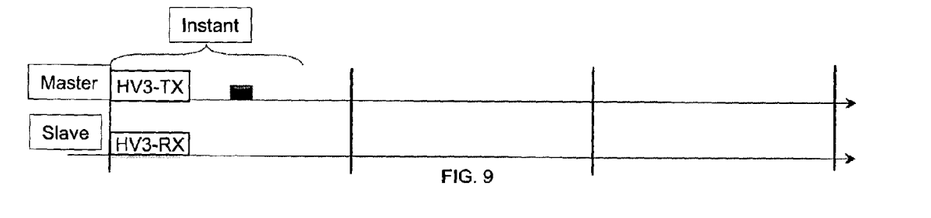

Referring to FIGS. 7 to 9, two Bluetooth® devices are connected with a SCO connection and they can receive or send data in a predetermined time slot (also referred to as reserved instant). HV3 packets are used in these examples. HV3 packets do not include a CRC and shall not be retransmitted. FIG. 7 shows an example of SCO transaction between a master and a slave wherein there are no retransmission opportunities. Within the same reserved instant, the master sends a packet 60 noted HV3-TX which is received by the slave (HV3-RX 61), and then the slave sends a packet noted HV3-TX 62 received by the master (HV3-RX 63). FIG. 8 shows an example of transaction wherein the master does not send any packet. The slave waits for a packet from the master, and then sends an HV3-TX message received by the master (HV3-RX). FIG. 9 shows an example of transaction wherein the slave does not send any packet in response to an HV3 packet sent by the master. In the examples of FIGS. 7-9, no acknowledgement is provided, which means that neither the master nor the slave can confirm that the packet was received correctly. For instance, on FIG. 9, the master does not know whether the slave correctly received the HV3 packet sent by the master.

Figure 10:
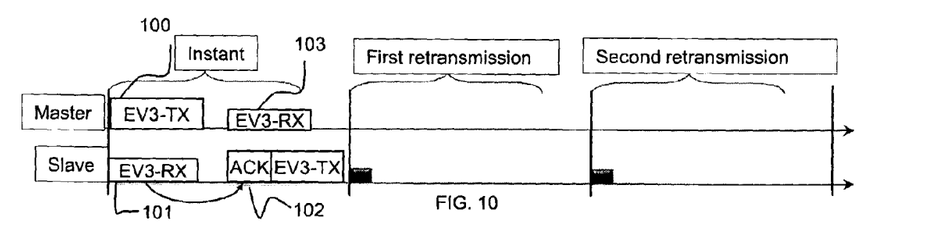
FIGS. 10 to 14 show examples of eSCO transactions between a master and a slave Bluetooth® devices.

Referring now to FIGS. 10 to 14, two Bluetooth® devices are connected with an eSCO connection and they can receive or send data in a reserved instant. EV3 packet types are used in these examples. EV3 packets include a CRC and retransmission may be applied if no acknowledgement of proper reception is received within the retransmission window. In FIG. 10, within the same reserved instant, the master sends a packet 100 noted EV3-TX which is received by the slave (EV3-RX 101). Then, the slave sends a packet 102 noted EV3-TX that is received by the master (EV3-RX 102). The packet EV3-TX 102 sent by the slave comprises an acknowledgement (ACK) so that the master knows that the packet EV3-TX 100 was received correctly and not damaged. The first and second retransmission reserved instants are not used to retransmit packets in as much as the transmissions of both packet EV3-TX 100 and 102 were correct.

Figure 11:
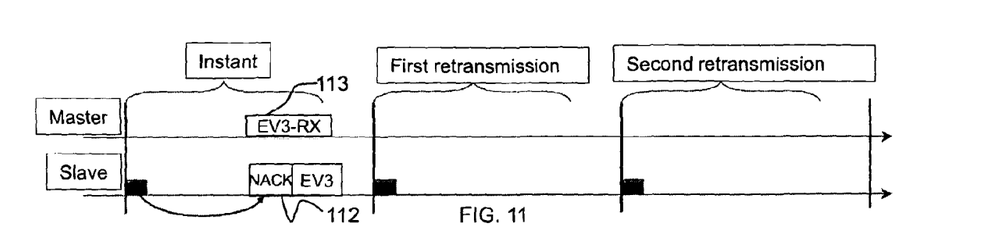

FIG. 11 exemplifies an eSCO transaction wherein the master does not send a packet. The slave expects to receive a packet from the master, and sends an EV3 packet 112 to the master that comprises a non acknowledgment indicating that the expected message has not been received. The master correctly receives the EV3 packet 113 and no retransmission is carried out by the master as no packet has to be sent by the master to the slave. The slave waits for a packet sent by the master during the first and second retransmission reserved instants.

Figure 12:
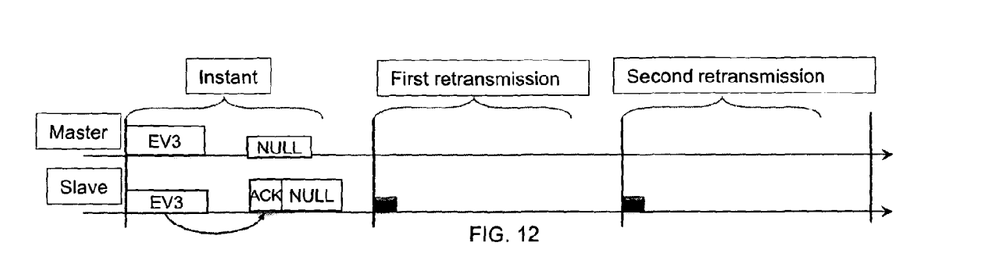

FIG. 12 exemplifies the reverse situation of FIG. 11: the slave does not send a packet after that the master had sent one. In order to keep the master informed of the good reception of the EV3 packet, the slave sends an acknowledgement (ACK) with a NULL packet. NULL packets are sent in order to send link control information to the other devices, e.g. ACK information for received data. The master receives the NULL packet and is therefore informed of the proper reception by the slave of the EV3 packet. As a result, no retransmission of the EV3 packet occurs.

Figure 13:
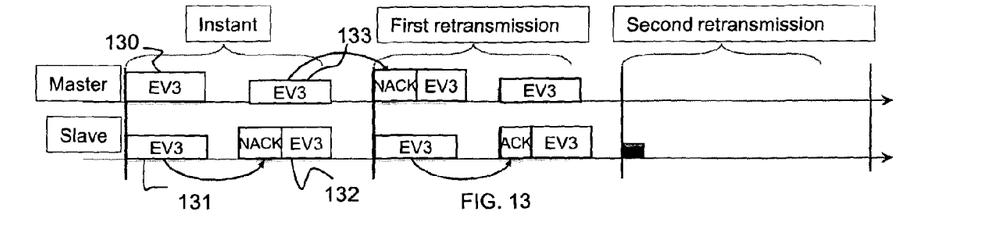

FIG. 13 exemplifies a transaction wherein both packets sent by the master and the slave are incorrectly received, thus triggering a retransmission. The master sends an EV3 packet 130, and the slave incorrectly receives the EV3 packet 131. In turn, the slave sends an EV3 packet 132 comprising a non acknowledgment (NACK) for indicating the incorrect reception of the EV3 packet 130. The master incorrectly receives the EV3 packet 133. Retransmissions of the EV3 packet 130, 132 incorrectly received are then performed during the first retransmission reserved instant. The retransmission is performed in a similar way as for the transaction described in relation with FIG. 10, excepted that the master sends an EV3 packet with a non acknowledgment (NACK) for indicating the incorrect reception of the EV3 packet 132. As the retransmissions of the packets 130 and 132 are correctly performed, no further retransmission needs to be done in the second retransmission reserved instant.

Figure 14:
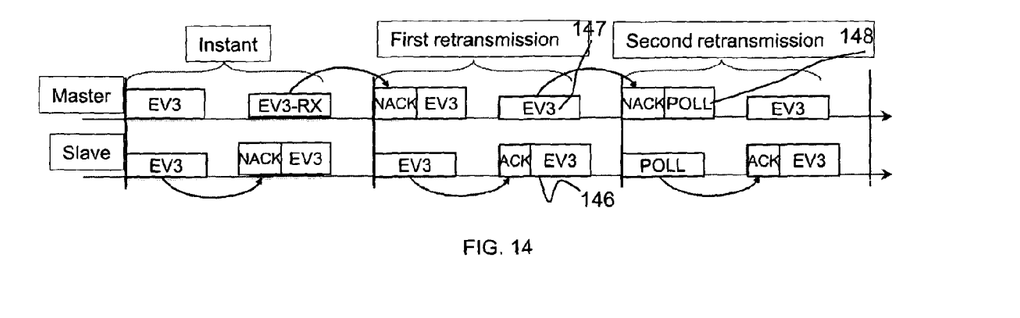

FIG. 14 is an example of a transaction wherein the packets sent by the master and the slave within the same reserved instant are incorrectly received, thus triggering a retransmission in a first retransmission reserved instant as in relation with FIG. 13. However, in FIG. 14, the retransmitted packet EV3 147 is incorrectly received by the master. As a result, the master sends a non acknowledgement (NACK) with a POLL packet 148 in a second retransmission reserved instant. A NULL packet may be used by the master; however, the slave is not forced to respond to the NULL packet from the master. If the master requires a response, it sends a POLL packet. Upon reception of the POLL packet 148 comprising the NACK, the slave retransmits the EV3 packet 146 with an acknowledgment for confirming the correct reception of the POLL packet 146. Finally, the master correctly receives the EV3 packet.

Figure 1:
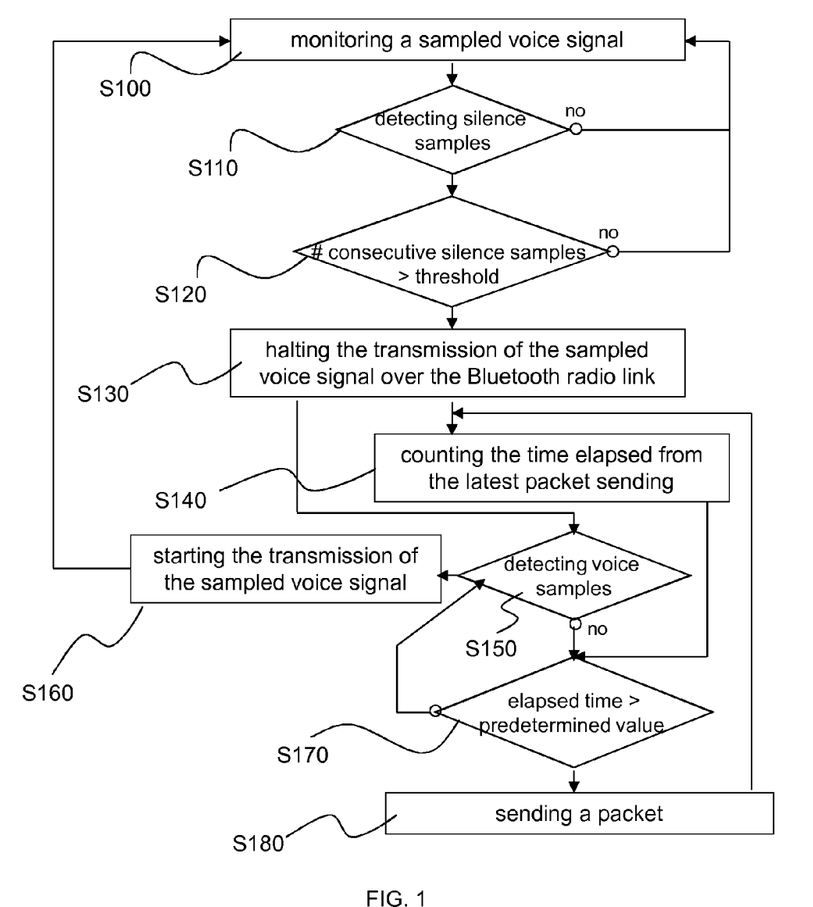
FIG. 1 shows a flowchart of a method for controlling the transmission of a sampled voice signal over a Bluetooth® radio link, in accordance with an embodiment of the invention.

Therefore, referring to FIG. 1, it is provided a method for controlling the transmission of a sampled voice signal over a Bluetooth® radio link. The method comprises a step of monitoring (S100) the sampled voice signal for detecting (S110) whether the sampled voice signal comprises a number of consecutive silence samples. The method also comprises a step of halting (S130) the transmission of the sampled voice signal over the Bluetooth® radio link according to the detection of the monitoring step. Halting the transmission encompasses both stopping definitively or temporarily the transmission of the sampled voice signal.

The expression "according to the detection of the monitoring step" means that a result is provided by the monitoring step and that the halt of the transmission of the sampled voice signal depends on this result. More precisely, it should be understood that the transmission of the sampled voice signal is halted when a number of consecutive silence samples is detected and after that these consecutive silence samples have been transmitted over the Bluetooth® radio link.

Such a method is an improved way of controlling the transmission of a voice signal over a Bluetooth® radio link, typically a sampled voice signal. Notably, the method provides a significant power consumption improvement to both a transmitter and a receiver when operating a radio link such as a Bluetooth® radio link for transmitting a sampled voice signal. In addition, the method is only carried out on the transmitter side in a Bluetooth® communication system comprising a transmitter and a receiver. Furthermore, the transmission of the sampled voice signal is halted gracefully; this means that the transmission is halted in accordance with transmission termination phase of Bluetooth® protocol, if any. For instance, referring back to FIG. 12, the slave does not send a packet containing one or more samples of the sampled voice signal after that the master had sent one because a number of consecutive silence samples has been detected on the slave side. Nevertheless, the slave can send to the master a NULL packet as only the transmission of the sampled voice signal is halted.

At step S100, a sampled voice signal is monitored, that is, the sampled voice signal is checked. A sampled voice signal means a voice signal to be transmitted on the radio link is converted from a continuous signal to a discrete signal. A voice signal may be also referred to as speech signal. The sampling of the voice signal allows to transmit the voice signal with fewer loss of quality. The sampling of the voice signal may be performed by an analog-to-digital converter (ADC) as known in the art.

The monitoring of the sampled voice signal is performed for detecting silence samples in the sampled voice signal (step S110). A silence sample is a sample that contains silence; silence is the absence of human speech in the part of voice signal corresponding to a considered sample to be transmitted. In other terms, a silence sample is a non-speech sample.

Detecting whether the sampled voice signal comprises silence samples may be performed by simple techniques like threshold detection or by using a Voice Activity Detector (VAD). These techniques of silence detection are known in the art; for instance, the detection may be based on the analysis of the energy of the voice signal, on pitch-period detection or on spectral information of the voice signal. In fact, any suitable existing or future method may be used for the detection step.

Next to the detection of silence samples in the sampled voice signal, it is determined at step S120 whether a number of consecutive silence samples is detected. One can also say that it is checked whether or not a threshold representing a minimum number of silence samples to be detected is reached. By consecutive silence samples, it is meant that only silence samples are successively detected.

Interestingly, the determination of a number of consecutive silence samples ensures that it is worth to halt the transmission of the sampled voice signal: indeed, it is not desirable to stop the communication when only few silence samples are detected.

Figure 2:
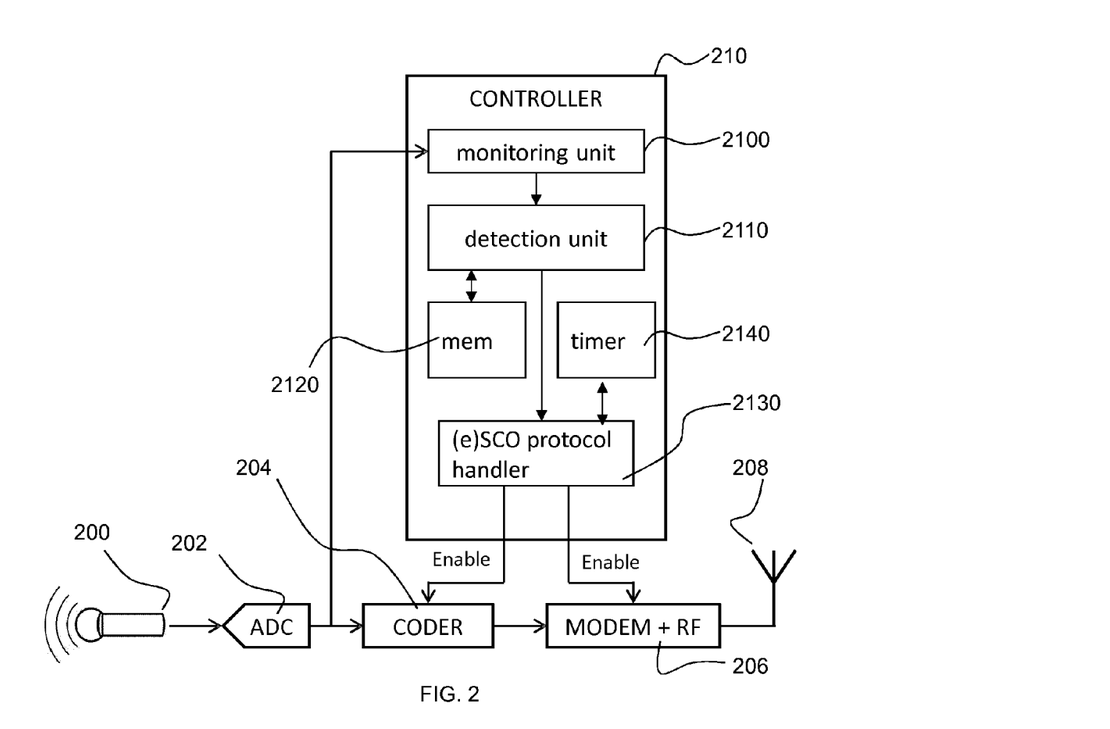
FIG. 2 shows a block diagram illustrating an exemplary configuration of a Bluetooth® device acting as a transmitter, in accordance with an embodiment of the invention.

In addition, it also ensures that no transient effects appear in a codec: indeed, as it is apparent in FIG. 2, the sampled voice signals are compressed by codec such as a voice codec before transmission over a radio link such as a Bluetooth® radio link. Transient effects result from the evolution of the codec from a current state (e.g. while the codec is compressing the voice samples) to a new state (e.g. while the codec is compressing the silence samples). Thus, before halting the transmission, it is advantageous that the codec is emptied, that is, the state of the codec depends only on silence samples before the transmission is halted. The detected successive silence samples are thus transmitted. For instance, Bluetooth® uses a SubBand Codec (SBC) for wideband speech, and the filters of the SBC codec are 80 taps finite impulse response (FIR) filters; this involves that a minimum of 80 consecutive speech samples need to contain silence before the filters are faded out.

Advantageously, emptying the codec at the transmitter side facilitates the reconstruction of the missing samples resulting from the halt of the transmission at the receiver side. Indeed, the sampled voice signal is usually transmitted into packets containing one or more samples of the sampled voice signal, and packet loss may prevent proper demodulation. In order to avoid loss of speech quality, logics may be invoked at the decoder side such as packet loss concealment (PLC) logic, pitch-period error concealment (PPEC), or zero insertion. In other terms, when the receiver does not correlate, it will reconstruct the missing packet(s) using the above mentioned logics. A proper match between encoder and decoder states has to be ensured in order to avoid the generation of errors leading to distortion of the sampled voice signal in the receiver. A mismatch between the states of the transmitter and the receiver codec may occur e.g. when the transmission is restarted after having been prematurely halted due to silence. In such cases, the codec of the transmitter typically starts at an emptied state (since the codec may typically be running even though nothing is transmitted), while the codec of the receiver starts from a state corresponding to the current state at the halting of transmission. Those two states are typically not the same and the situation may cause errors. As, according to embodiments of the invention, the codec of the transmitter has been emptied before halting the transmission, some packets containing silence samples preceded the missing packet(s), and therefore, the reconstruction in the receiver of the missing packet(s) will result in silence too. Hence, reconstruction of the missing packet(s) occurs with no or limited loss of speech quality. In other words, the <<going-into-silence>> distortion and <<coming-out-of-silence>> distortion are avoided. Additionally, no new handshake procedure or similar is necessary as the reconstruction relies on logics implemented on the devices. Consequently, the method according to the invention may be implemented with existing devices, and it can function with legacy receiver as no change in signaling protocol is required.

In practice, the number of consecutive silence samples may be predetermined or configurable. Advantageously, it may be adapted to a specific codec of the transmitter, thus increasing the speech quality. As seen above, the SBC codec involves that a minimum of 80 consecutive speech samples need to contain silence before the filters of the codec are faded out.

Alternatively, the number of consecutive silence samples may be dynamically determined. This allows to automatically adapt the threshold representing a minimum number of silence samples to be detected. This may be performed according to particular circumstances, e.g. the voice signal volume.

In practice, the monitoring of the sampled voice signal for detecting whether the sampled voice signal comprises silence samples may be continuously performed. This involves that the detection of the sampled voice signal is performed while sampling of the voice signal goes on; in other term, while the voice signal is sampled.

At step S130, the transmission over the radio link such as a Bluetooth® radio link is stopped: no more packets are sent from the transmitter to the receiver which involves that no more packets comprising silence samples is sent.

From now, the receiver will not succeed to correlate as no packets are transmitted over the Bluetooth® radio link and as a consequence the receiver will close the Bluetooth® radio link after the time it expected to achieve correlation. As a result, if the silence in the voice signal spans more that a predetermined time, the receiver close the radio link with the transmitter as the minimum amount of transactions is no more reached.

When the transmission is halted, the time elapsed between the current time and the time at which the latest packet was sent over the radio link is counted, as illustrated at step S140. This amounts to say that a counter starts to measure the time elapsed.

As discussed previously, some packets containing silence samples preceded the packet(s) missing on the link because the codec has been emptied before halting the transmission. Therefore, the latest packet sent before halting the transmission comprises the latest silence samples obtained from the codec.

When the transmission is halted, the sampled voice signal is monitored for detecting whether the sampled voice signal comprises voice samples (S150). It is to be understood that the steps S140 and S150 may be concurrently triggered. When a voice sample is detected, the transmission of the sampled voice signal is started, or started again (S160). In this case, the coding of the sampled voice signal is also transmitted.

Once the transmission of the sampled voice signal is started, or started again, monitoring according to step S100 is resumed and it is detected whether the sampled voice signal comprises silence samples in accordance with steps S110 to S120.

In the case no voice sample is detected in the sampled voice signal at step S150, it is checked whether the elapsed time reaches a predetermined value (S170). If the elapsed time does no reach the predetermined value, then the sampled voice signal is still monitored for detecting whether the sampled voice signal comprises voice samples. In the event the elapsed time reaches a predetermined value, then a packet is sent over the radio link, at step S180. Once a packet is sent over the radio link at step S180, then the counter is reset and the counting is restarted. It is to be understood that the counter is reset and the counting is restarted once a packet is successfully sent, that is, correctly received by the receiver. For instance, eSCO links use an ARQ (Automatic Repeat Request) scheme to achieve reliable data transmission that uses acknowledgements, as illustrated on FIGS. 10 to 14: EV3 packets shall be transmitted until acknowledgement of a successful reception is returned by the destination. Another example, SCO link does not benefit such ARQ scheme, and reliability of data transmission may resort into sending a few packets or sending POLL or NULL packet instead.

The predetermined value is selected for causing the Bluetooth® radio link to be maintained. Therefore, the control of the transmission of a sampled voice signal over a Bluetooth® radio link according to the invention allows maintaining the synchronization between the transmitter and the receiver; a connection loss is avoided. Silences in the voice signal can therefore have any duration. The packet sent by the transmitter for avoiding the loss of the radio link may be a silence packet.

In practice, the maximum time between two transactions (that is, between the transmission of two packets) is 250 ms for a Bluetooth® radio link; no matter the Bluetooth® radio link is a SCO or an e-SCO link. Thus, the predetermined value may be 250 ms, or less. It is to be understood that the predetermined value may be implementation dependant; for instance, the maximum time between two packets may exceed 250 ms depending on the accuracy of the clock of one of the device.

The method may be carried out by a computer program comprising instructions for performing the method. The program is executable on a programmable device. The application program may be implemented in a high-level procedural or object-oriented programming language, or in assembly or machine language if desired. In any case, the language may be a compiled or interpreted language. The program may be a full installation program, or an update program. In the latter case, the program is an update program that updates a programmable device, previously programmed for performing parts of the method, to a state wherein the device is suitable for performing the whole method.

The program may be recorded on a data storage medium. The data storage medium may be any memory adapted for recording computer instructions. The data storage medium may thus be any form of nonvolatile memory, including by way of example semiconductor memory devices, such as EPROM, EEPROM, and flash memory devices; magnetic disks such as internal hard disks and removable disks; magneto-optical disks; and CD-ROM disks.

A device suitable for performing the method may be an electronic device comprising a Bluetooth® transmitter and the data storage medium. The device may have at least one hardware memory of the device. The memory may store any other information used by the method. For example, the memory may store information such as, but not limited to, the number of consecutive silence samples detected in the sampled voice signal to be transmitted, the time elapsed between the current time and the time at which the latest packet was sent over the Bluetooth® radio link for transmitting the sampled voice signal, the predetermined value for causing the Bluetooth® radio link to be maintained when the transmission between the transmitter and the receiver is halted. Also, the memory may store other information used in examples of the method. The memory is accessible by at least one Central Processing Unit (CPU) of the device. The CPU may execute the program and thus perform the method, without further programming of the device.

The device may further comprise an audio unit that may comprise suitable circuitry and/or software code for receiving and/or for reproducing an audio signal such as a voice signal, e.g. a microphone and a loudspeaker. The audio unit may further comprise suitable circuitry and/or software code for performing analog-to-digital conversion of audio signal received for instance by the microphone. The audio unit may further comprise suitable circuitry and/or software code for performing digital-to-analog conversion of audio signal received, the audio signal being then generated by the loudspeaker.

The device may further comprise a compression/decompression unit that may comprise suitable circuitry and/or software code for compressing/decompressing an audio signal. A voice codec (coder/decoder) may be of the type Continuously Variable Slope Delta Modulation (CVSD) codec for narrowband speech. A voice codec may be of the type SubBand Codec (SBC) for wideband speech. In fact, any suitable existing or future voice codec may be used.

The device may also comprise a monitoring unit that may comprise suitable circuitry and/or software code for detecting whether an audio signal may be present or absent in the audio unit. The monitoring unit may detect whether voice signal is present in the audio signal or silence is present in the audio signal. The monitoring unit may generate and transfer information on the presence/absence of an audio signal to a control unit, on a regular basis or at every change point of detection or non-detection of an audio signal.

The device may also comprise a Bluetooth® unit that may comprise suitable circuitry and/or software code for enabling Bluetooth® radio link. The Bluetooth® unit may comprise a Bluetooth® Radio Frequency to generate radio links for data transmission. The Bluetooth® unit may also comprise Bluetooth® modem (modulator-demodulator) for modulating an analog carrier signal to encode digital data (e.g. voice) and also for demodulating an analog carrier signal to decode the transmitted data.

The device may further comprise an antenna that may comprise suitable circuitry and/or software code for transmitting and/or receiving a radio link, e.g. a Bluetooth® radio link for communicating with another device. The antenna may be operatively connected to the Bluetooth® unit.

The device may be a communication device. The device may thus comprise a signal emitter and a signal receiver. For example, the device may be a telephone. The device may be mobile (i.e. transportable). The device may for example be a mobile phone (e.g. a cell phone), or more generally a wireless communication device. The device may also be a wirelink communication device.

The device may store a computer program. The computer program may be stored on the at least one hardware memory of the device. The computer program may be used to control the execution of one or more units of the device.

Referring now to FIG. 2, an exemplary configuration of a Bluetooth® device acting as transmitter in accordance with an embodiment of the invention is illustrated. The Bluetooth® transmitter comprises an audio unit comprising a microphone 200 that may be used to receive a voice signal such as user's voice and an analog-to-digital (ADC) converter 202 able to sample a voice signal received by the microphone. The Bluetooth® transmitter further comprises a compression unit 204 able to compress the sampled voice signal; typically, the compressor may be provided by CVSD or SBC codecs. The Bluetooth® transmitter further comprises a Bluetooth® unit 206 (or Bluetooth® module 206) able to modulate a carrier for transmitting the voice signal to a receiver as the one illustrated on FIG. 3. The Bluetooth® unit further comprises a radio frequency generator. The Bluetooth® unit is connected to an antenna 208. The Bluetooth® transmitter further comprises a controller 210 for performing the method of the invention for controlling the transmission of a sampled voice signal over a Bluetooth® radio link. The controller 210 may comprise a monitoring unit 2100 or it may be operatively coupled to a monitoring unit so that the monitoring unit is able to transmit to the controller results of the detection. The monitoring unit 2100 is adapted to monitor the sampled voice signal, for example in accordance with step S100 on FIG. 1. The controller 210 may also comprise a detection unit 2110 able to dynamically determine the number of consecutive silence samples to be detected before halting the transmission, for instance in accordance with steps S110 and S120 on FIG. 1. The detection unit may also be adapted to dynamically detect voice samples in the sample voice signal to be transmitted, for instance in accordance with the step S150 on FIG. 1. More generally, the detection unit may be adapted to detect whether the samples are voice or silence samples. The controller 210 may further comprise a memory unit 2120 for storing information such as thresholds (e.g. the number of consecutive silence samples detected in the sampled voice signal), the predetermined value for causing the Bluetooth® radio link to be maintained when the transmission is halted. The memory unit 2120 may be operatively coupled with the detection unit 2110 so that the detection unit may access the number of consecutive silence samples to be detected. The controller may also comprise a protocol handler 2130 for halting or starting the sending of packets over the Bluetooth® radio link, for instance in accordance with the steps S130 or S160. The protocol handler may be an SCO protocol handler and/or an e-SCO protocol handler for SCO and/or e-SCO Bluetooth® radio link. The protocol handler 2130 may be also adapted to send a packet for causing the Bluetooth® radio link to be maintained, for instance in accordance with step S180 in FIG. 1. The protocol handler 2130 may be operatively coupled with the Bluetooth® unit 206 so that the protocol handler 2130 may trigger the halt or the start of a transmission of packets on the Bluetooth® radio link. The protocol handler 2130 may also be operatively coupled with the compression unit 204 for controlling compression operation: the compression unit may be halted when the transmission over the Bluetooth® radio link is halted. It is to be understood that the compression unit may be kept running even if the transmission is halted. The controller 210 may also comprise a timer 2140 for counting the time elapsed between the current time and the time at which the latest packet was sent over the Bluetooth® radio link, for instance in accordance with steps S140. The timer 2140 may be operatively coupled with the (e)SCO protocol handler 2130 so that the timer 2140 may be informed by the (e)SCO protocol handler that a packet has been sent over the Bluetooth® radio link. The timer 2140 may also be adapted to detect whether the elapsed time exceed a predetermined value, for instance in accordance with the step S170. The timer may also be operatively coupled with the memory 2120 that may store the predetermined value.

It is to be understood that the terms "monitoring unit", "memory unit", "detection unit", "timer" and "protocol handler" refer to functional entities. In particular, the term unit shall not be interpreted as limiting the monitoring, memory and detection units to structural entities. For instance, the monitoring unit, the memory unit, the detection unit, the timer and the protocol handler may be implemented on a same data-processor or a same electronic chip. They may be implemented under the form of a computer program that may be executed by the data-processor.

Figure 3:
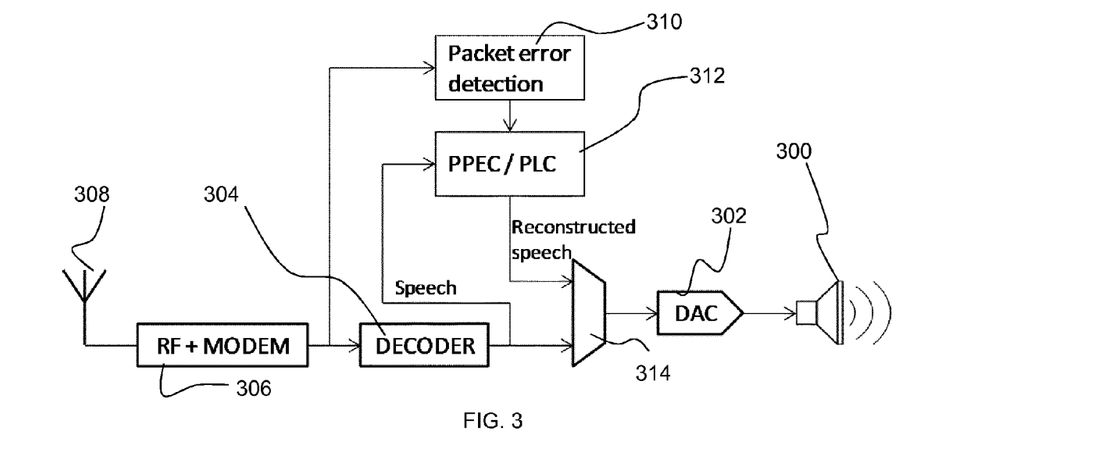
FIG. 3 shows a block diagram illustrating an exemplary configuration of a Bluetooth® device acting as a receiver, in accordance with an embodiment of the invention.

Referring now to FIG. 3, an exemplary configuration of a Bluetooth® device acting as a receiver in accordance with an embodiment of the invention is depicted. The Bluetooth® receiver comprises an audio unit comprising a loudspeaker 300 that may be used to play a voice signal such as user's voice and an digital-to-analog converter 302 (DAC) able to convert a digital sampled voice signal into an analog voice signal play by the loudspeaker 300. The Bluetooth® receiver may further comprise a decompression unit 304 able to decompress the sampled voice signal. The Bluetooth® receiver may further comprise a Bluetooth® unit 306 (or Bluetooth® module 306) able to demodulate a carrier emitted by a transmitter as the one illustrated on FIG. 2. The Bluetooth® unit may further comprise a radio frequency generator. The Bluetooth® unit may be connected to an antenna 308. The Bluetooth® receiver may further comprise a packet error detector 310 able to assess whether the received packets containing the sampled voice signal is reliable. In practice, the packet error detector may be operatively coupled to the output of the Bluetooth® unit 306. Bluetooth® receiver may further comprise logics 312 for correcting detected errors such as packet loss concealment (PLC) logic, pitch-period error concealment (PPEC), or zero insertion. The logics 312 may be operatively coupled with the output of the decompression unit 304 for reconstructing the voice signal. The outputs of the decompression unit 304 and the logics 312 may be operatively coupled to a selector 314 adapted to select which of the voice signals provided by the outputs of the decompression unit 304 and the logics 312 is transferred to the DAC 302. The voice signal (or the reconstructed voice signal) may be then transferred to the DAC 302 and played through the loudspeaker 300.

Figure 4:
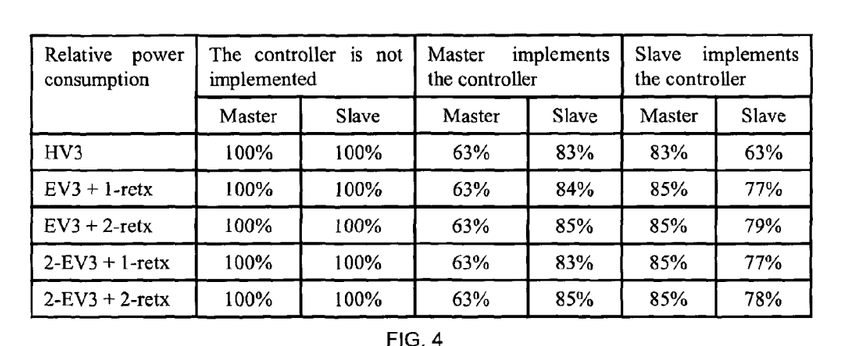
FIG. 4 shows a table containing measures of the relative power consumption on both the transmitter and the receiver, in accordance with an embodiment of the invention.

The table of FIG. 4 shows measures of the relative power consumption (referred to when the transmitter does not implement the invention) performed on both master and slave when the method of the invention is not implemented, and when the master implements the method of the invention or when the slave implements it. The measures were performed with voice signal comprising 60% of silence. The measures were performed for different kind of packets: HV3 packets type for a SCO link, and, for e-SCO link, EV3 packets type with one or two retransmission (retx) and 2-EV3 packets with one or two retx. It is noticeable that the power consumption highly decreases for the transmitter (the master or the slave) implementing the method for controlling transmission of the invention. The power consumption of the receiver (the slave or the master) also decreases despite it is not involved in carrying out the method of the invention: indeed, fewer packets are received by the receiver, thus decreasing the active time of the RF receiver, which in turn decreases power consumption.

Figure 5:
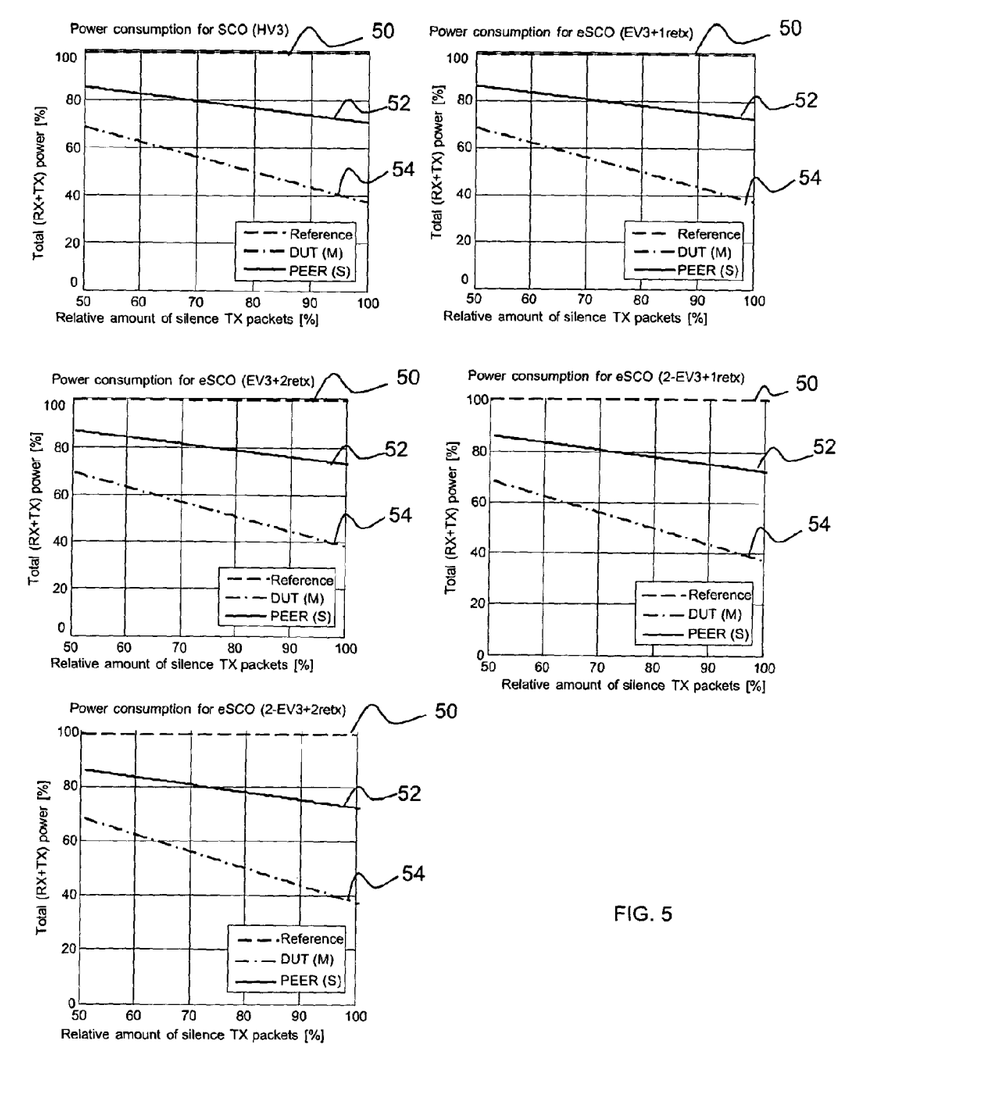
FIGS. 5 and 6 show graphics representative of measures of FIG. 4 of the relative power consumption on both the transmitter and the receiver, in accordance with an embodiment of the invention.
Figure 6:
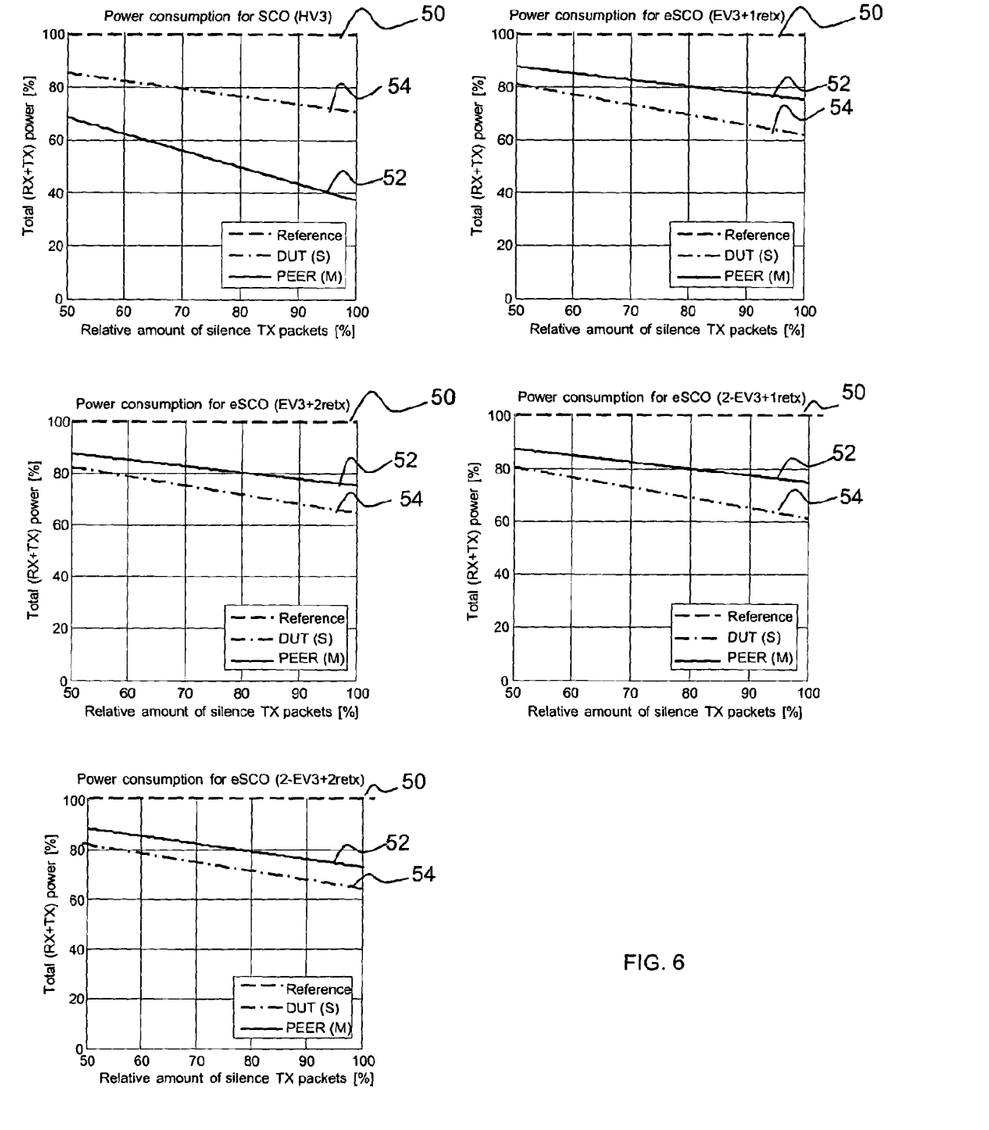

FIGS. 5 and 6 shows measures of the relative power consumption performed on both master and slave when the master implements the method of the invention or when the slave implements it. The measures were performed for different kind of packets similar as those of FIG. 4. The curves noted 50 represents the relative power consumption of a reference device, that is, a transmitter that does not implement the method according to the invention. The curves noted 54 represents the relative power consumption of the device under test (DUT), that is, implementing the method for controlling the transmission of a sampled voice signal over a Bluetooth® radio link. The DUT is the master. The curves noted 52 represent the relative power consumption of the peer, here the slave. The results are similar to those of FIG. 4. Notably, the power consumption decreases on both SCO links and e-SCO link.

The invention has been described with reference to preferred embodiments. However, many variations are possible within the scope of the invention. For instance, the radio link could be different from Bluetooth® radio link. By radio link it is meant a wireless link. More generally, the radio link may be any radio link that provides a full-duplex symmetric link between a master and a slave with reserved time slots, the radio link providing or not retransmission mechanisms. As another example, a wireline may benefit of the method according to the invention.

The invention claimed is:

1. A method for controlling the transmission of a sampled voice signal over a Bluetooth® radio link, the method comprising the steps of:
 a) monitoring, by a monitoring unit of a controller, the sampled voice signal;
 b) detecting, by a detection unit of the controller, whether the sampled voice signal comprises a number of consecutive silence samples and detecting the number of consecutive silence samples, wherein the number of consecutive silence samples is dynamically determined to automatically change a threshold value representing a minimum number of silence samples to be detected before halting the transmission of the sampled voice signal over the Bluetooth® radio link and wherein the threshold value is dynamically determined based on a voice signal volume; and
 c) halting, by a protocol handler of the controller, the transmission of the sampled voice signal over the Bluetooth® radio link after having transmitted said consecutive silence samples, wherein a codec of a transmitter is emptied before halting the transmission.

2. The method of claim 1, further comprising, after step b), the steps of:
 c) monitoring the sampled voice signal for detecting whether the sampled voice signal comprises voice samples; and
 d) starting the transmission of the sampled voice signal over the Bluetooth® radio link according to the detection in step c).

3. The method of claim 1, wherein the sampled voice signal is sent over the Bluetooth® radio link in packets, the method further comprising, after step b), the step of:
 e) maintaining the Bluetooth® radio link by sending time to time one or more packet(s) over the Bluetooth® radio link.

4. The method of claim 3, wherein the step e) comprises the steps of:
 f) counting the time elapsed between the current time and the time at which the latest packet was sent over the Bluetooth® radio link;
 g) sending one or more packet(s) over the Bluetooth® radio link for maintaining the Bluetooth® radio link when the elapsed time reaches a predetermined value; and
 h) applying again steps f) and g) with respect to the latest packet sent at step g).

5. The method of claim 1, wherein the Bluetooth® radio link is one of a synchronous connection-oriented link or an enhanced synchronous connection-oriented link.

6. The method of claim 1, wherein only a single timer is used, and the single timer counts an elapsed time between a current time and a time at which a latest packet was transmitted over the Bluetooth® radio link.

7. A computer program product comprising a non-transitory computer readable medium, having thereon a computer program comprising program instructions, the computer program being loadable into a data-processing unit and adapted to cause execution of the method according to claim 1 when the computer program is run by the data-processing unit.

8. A controller for controlling the transmission of a sampled voice signal over a Bluetooth® radio link, the controller comprising:
 a monitoring unit adapted to monitor the sampled voice signal;
 a detection unit adapted to detect whether the sampled voice signal comprises a number of consecutive silence samples and to detect the number of consecutive silence samples, wherein the number of consecutive silence samples is dynamically determined to automatically change a threshold value representing a minimum number of silence samples to be detected before halting the transmission of the sampled voice signal over the Bluetooth® radio link and wherein the threshold value is dynamically determined based on a voice signal volume; and
 a protocol handler adapted to halt the transmission of the sampled voice signal over the Bluetooth® radio link after having transmitted said consecutive silence samples, wherein a codec of a transmitter is emptied before the transmission is halted.

9. The controller of claim 8, wherein:
 the detection unit is further adapted to detect whether the sampled voice signal comprises voice samples; and
 the protocol handler is further adapted to start the transmission of the sampled voice signal over the Bluetooth® radio link according to the detection of the detection unit.

10. The controller of claim 8, wherein the protocol handler is further adapted to maintaining the Bluetooth® radio link by sending time to time one or more packet(s) over the Bluetooth® radio link.

11. The controller of claim 10, further comprising a timer adapted to count the time elapsed between the current time and the time at which the latest packet was sent over the Bluetooth® radio link, and wherein the protocol handler is further adapted to send one or more packet(s) over the Bluetooth® radio link for maintaining the Bluetooth® radio link when the elapsed time reaches a predetermined value.

12. The controller of claim 11, wherein the memory is further adapted to store predetermined value to be reached by the elapsed time.

13. The controller of one of claim 8, further comprising a memory adapted to store the number of consecutive silence samples to be detected in the sampled voice signal for halting the transmission of the sampled voice signal over the Bluetooth® radio link.

14. The controller of claim 8, wherein the protocol handler is further adapted to handle a synchronous connection-oriented Bluetooth® radio link and/or an enhanced synchronous connection-oriented Bluetooth® radio link.

15. An electronic device, comprising:
a Bluetooth® module; and
a controller according to claim 8 for controlling the transmission of a voice signal by the Bluetooth® module over a Bluetooth® radio link.

16. The electronic device of claim 15, further comprising:
a memory adapted to store a computer program for controlling the execution of one or more units of the controller.

* * * * *

UNITED STATES PATENT AND TRADEMARK OFFICE
CERTIFICATE OF CORRECTION

PATENT NO. : 9,456,296 B2  
APPLICATION NO. : 14/131333  
DATED : September 27, 2016  
INVENTOR(S) : Yves Wernaers Page 1 of 1

It is certified that error appears in the above-identified patent and that said Letters Patent is hereby corrected as shown below:

In the Specification

In Column 3, Line 58, delete "off)" and insert -- of f) --, therefor.

In Column 8, Line 62, delete "more that" and insert -- more than --, therefor.

In the Claims

In Column 15, Line 15, in Claim 13, delete "one of claim" and insert -- claim --, therefor.

Signed and Sealed this  
Twenty-ninth Day of October, 2019

Andrei Iancu  
*Director of the United States Patent and Trademark Office*